United States Patent
Watanabe et al.

(10) Patent No.: US 7,027,963 B2
(45) Date of Patent: Apr. 11, 2006

(54) SIMULATION SYSTEM

(75) Inventors: Atsushi Watanabe, Tokyo (JP); Yoshiharu Nagatsuka, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 712 days.

(21) Appl. No.: 10/286,863

(22) Filed: Nov. 4, 2002

(65) Prior Publication Data
US 2003/0090489 A1    May 15, 2003

(30) Foreign Application Priority Data
Nov. 12, 2001   (JP)   ............................. 2001-346775

(51) Int. Cl.
*G06F 17/50*   (2006.01)
(52) U.S. Cl. ........................ 703/1; 345/420; 700/182
(58) Field of Classification Search ............... 703/7, 703/1; 345/419, 420, 427; 700/182, 98, 700/118
See application file for complete search history.

(56) References Cited

U.S. PATENT DOCUMENTS

| | | | |
|---|---|---|---|
| 4,879,667 A | | 11/1989 | Gorski et al. |
| 4,970,666 A | * | 11/1990 | Welsh et al. ............... 345/423 |
| 5,161,101 A | | 11/1992 | Nishiyama et al. |
| 5,745,117 A | * | 4/1998 | Masuda et al. ............ 345/420 |
| 5,990,900 A | * | 11/1999 | Seago ....................... 345/427 |
| 6,112,133 A | | 8/2000 | Fishman |
| 6,246,468 B1 | * | 6/2001 | Dimsdale ................... 356/4.02 |
| 6,290,571 B1 | | 9/2001 | Dilger et al. |
| 6,341,996 B1 | * | 1/2002 | Brien et al. ................... 451/8 |
| 6,409,596 B1 | * | 6/2002 | Hayashida et al. .......... 463/31 |

FOREIGN PATENT DOCUMENTS

| | | |
|---|---|---|
| EP | 1 092 513 A2 | 4/2001 |
| JP | 06-202727 | 7/1994 |
| JP | 08-016786 | 1/1996 |
| JP | 10-307935 | 11/1998 |
| JP | 11-066113 | 3/1999 |
| JP | 2001-105359 | 4/2001 |
| JP | 2001-18679 | 7/2001 |

OTHER PUBLICATIONS

Japanese Office Action mailed Dec. 24, 2003 in Japanese Application No. 2001-346775.
EP Search Report for corresponding application EP 0225 7698 dated Aug. 25, 2004.
Monica Carfagni, "Disegno Assistito Dall'Elaboratore", vol. 1, 1999 (pp. 6-1 to 6-23).

* cited by examiner

*Primary Examiner*—Albert W. Paladini
(74) *Attorney, Agent, or Firm*—Staas & Halsey LLP

(57) ABSTRACT

Geometric information, layout information, etc. of workpieces and others are read from a CAD system etc. into a simulation system. A three-dimensional model is laid out on a screen of the simulation system by using layout plans and shape data of a robot, workpiece, and worktable. An operating-point sequence (for example, sequence of welding point) is created by specifying a point sequence, a line segment, or a plane to create a motion program. According to this motion program data, robot simulation is performed.

9 Claims, 11 Drawing Sheets

21b

23b

22

SIMULATION SYSTEM

BACKGROUND OF THE INVENTION

1. Field of the Invention

The present invention relates to a simulation system in which three-dimensional models of peripheral equipment and workpiece which are placed near an operating machine to be simulated such as a robot and a machine tool are generated, and these models are used with a three-dimensional model of the operating machine to be simulated.

2. Description of the Prior Art

At the time of using a simulation system for application studies of a robot system, cycle time simulations, or the like, first a creation of three-dimensional models of the hand, the peripheral equipment, and the machine of interest is necessary. To that end, an operator has to directly create three-dimensional models by means of a simulation system, often causing much time to be spent till the simulation is performed.

In an alternative practice, before performing the simulation, three-dimensional models of the above described operating machine (a robot, a machine tool, etc.), its peripheral equipment, and workpieces are created on a CAD system separated from the simulation system, and are inputted to the simulation system.

As so far described, considering the facts that three-dimensional models needs to be created separately even though two-dimensional geometric information created by a separate CAD system is available, that users of a simulation system for robots or the like are not necessarily exploiting a three-dimensional CAD system, and that two-dimensional CAD systems have become into widespread use, it is speculated that efforts for creating three-dimensional models will be substantially reduced if machine drawings of workpieces and others created by a two-dimensional CAD system can be exploited.

In particular, in creating three-dimensional models of workpieces of a complicated shape, the risk of making model errors is expected to be reduced.

OBJECTS AND SUMMARY OF THE INVENTION

It is an object of the present invention to provide a simulation system that enables an off-line simulation through rapid and accurate construction of a three-dimensional model of the system comprising an operating machine, its peripheral equipment, and others by importing two-dimensional information of the operating machine and its peripheral equipment prepared in a CAD system.

The present invention is applied to a simulation system that performs a practical simulation by combining a three-dimensional model of an operating machine such as a robot and a machine tool, with three-dimensional models of the peripheral equipment and the workpiece.

According to one feature of the present invention, the above described simulation system comprises means for storing a three-dimensional model of an operating machine, and means for inputting drawing information representing at least one two-dimensional shape of peripheral equipment or a workpiece. The above described drawing information includes three-dimensional layout information for laying out the two-dimensional shape in a three-dimensional manner and operating-point information to indicate the positions at which the operating machine is operated. Further, the simulation system comprises three-dimensional model generation means for assembling three-dimensional models of the peripheral equipment and the workpiece by laying out the two-dimensional shape on a screen of the simulation system based on the three-dimensional layout information, and means for operating the three-dimensional model of the operating machine on the screen based on the operating-point information read out from the above described drawing information.

According to another feature of the present invention, the simulation system comprises means for storing a three-dimensional model of an operating machine, means for acquiring operating-point information representing the positions at which the operating machine is operated, and means for inputting the drawing information representing at least one two-dimensional shape of the peripheral equipment or the workpiece. And the drawing information includes three-dimensional layout information to lay out a two-dimensional shape in a three-dimensional manner. Further, the simulation system comprises three-dimensional model generation means for assembling three-dimensional models of the peripheral equipment and the workpiece by laying out the two-dimensional shape on the screen of the simulation system based on the above described three-dimensional layout information, and means for operating the three-dimensional model of the operating machine on the screen based on the acquired operating-point information.

In either of the above described cases, it is preferable that the three-dimensional model generation means includes means for creating a three-dimensional shape by providing a thickness to arbitrary portion of a plane or line of a two-dimensional shape indicated in the drawing information. It is also preferable that the drawing information are projection drawings of at least two directions and the three-dimensional model generation means creates three-dimensional models based on the projection drawings of at least two directions and each of the directions.

It may be arranged such that the projection directions are two mutually perpendicular directions, and the three-dimensional information of an original line segment is determined based on the position information of four points which are obtained by choosing both ends of the corresponding projected line segment on each projection drawing of the two directions. Similarly, it may also be arranged such that the projection directions are two mutually perpendicular directions as described above, and the three-dimensional information of an original circle is determined based on the position information of six points obtained by choosing three points in the corresponding projected circle and three points in the corresponding projected line segment on each projection drawing of the two directions.

Moreover, the two projection drawings may be any combination of mutually perpendicular projection directions selected from a front view, a right side view, a left side view, a top view, a bottom view, and a rear view, based on a trigonometry or mono-angular projection. Also, the system preferably comprises means for storing an instruction program or a time chart of the operating machine, and means for operating the three-dimensional model of the operating machine on the screen according to the instruction program or the time chart. The present invention may be applied to the cases in which the simulation target includes a plurality of operating machines.

In the present invention having the above described configuration, three-dimensional models, two-dimensional shape information, and layout position information (not always all of them) of an operating machine such as a robot and a machine tool, and surrounding objects such as peripheral equipment and a workpiece, which are prepared by a CAD system, are inputted to the simulation system directly or indirectly via, for example, a communication line, an electronic information medium, or the like. In the case of two-dimensional shape information, position and posture information is added to the two-dimensional shape information so that it is laid out as a three-dimensional line segment or plane in a virtual three-dimensional space to create a simplified three-dimensional model. Upon performing a simulation, since there is a case in which a complete three-dimensional model is not necessarily required, a simplified three-dimensional model is prepared for the peripheral equipment and the workpiece to enable rapid execution of a simulation.

Also by providing a thickness to a portion surrounded by the above described planes and lines, or the like, it is made possible to create a three-dimensional model which is closer to the real object, thus enabling a more accurate simulation. To generate a more accurate three-dimensional model by utilizing two-dimensional shape information, means for providing relative position information between two shape information for a plurality of two-dimensional shape information may be provided.

For example, a front view and a right side view of the workpiece prepared by the orthographic projection method are read in to instruct the position in each view at which a specific point of the workpiece is indicated for each view. By doing so, the relative positions of two surfaces are determined. Thereafter, a three-dimensional model of the workpiece is completed by using a known three-dimensional model generation means such as a pushing-out of element exploiting the two drawings. Using two drawings makes it easy to generate a three-dimensional model. Also importing, from the CAD, the layout information of the system components such as a workpiece as well as two-dimensional shape information and three-dimensional model makes it possible to lay out the three-dimensional model in a virtual three-dimensional space.

For example, importing a plan view of system layout makes the system construction easy. Also by indicating the layout reference points of the workpiece and others in the layout plan view by symbols, it is made possible to lay out the three-dimensional model of the workpiece based on the symbols. Also, an operating-point sequence of a robot is read in to rapidly perform a simulation. The operating-point sequence information may be stored in the simulation system or may be imported from the information stored in a CAD system.

For example, by writing symbols to indicate operating points into the two-dimensional drawing, and importing that information together with the two-dimensional drawing to extract the above described symbols, it is made possible to automatically generate the operating-point sequence information. Moreover, it is also possible to store a motion program and a time chart in the simulation system to perform simulations using the motion program and the time chart. For example, when a time chart regarding the above described operating-point sequence is prepared, the simulation regarding the above described operating-point sequence may be performed without delay.

DETAILED DESCRIPTION OF THE PREFERRED EMBODIMENTS

Figure 1:
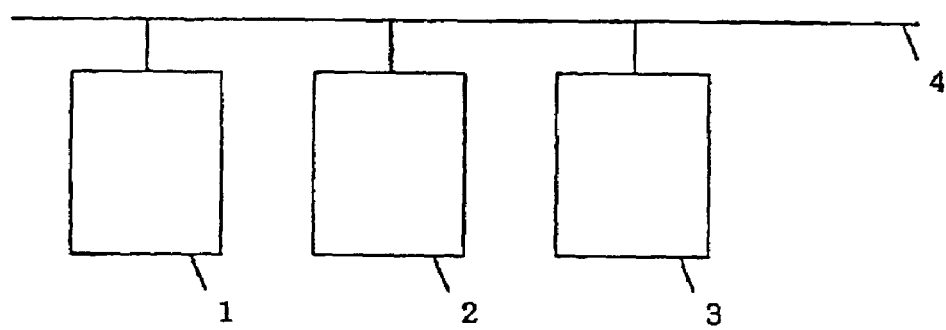
FIG. 1 shows one example of an arrangement for importing various data from a CAD system in each embodiment.

As described so far, in performing work by use of an operating machine such as a robot and a machine tool at a factory or the like, it is very often the case that three-dimensional model, two-dimensional shape information, and layout position information of the operating machine and surrounding objects are prepared in a CAD system in advance. Now, some examples will be briefly described for those cases. FIG. 1 shows one example of an arrangement for importing various data from a CAD system in each example of the invention.

In FIG. 1, reference numeral 1 denotes a simulation system, and the simulation system 1 is connected to a 2D-CAD system 2 and a 3D-CAD system 3 through a suitable communication line 4. The 2D-CAD system 2 and the 3D-CAD system 3 have CAD functions (processing, storing, input/output, etc.) to mainly deal with not higher than two-dimensional data and not higher than three-dimensional data respectively. In some cases, a CAD system having both functions may be utilized.

Figure 2:
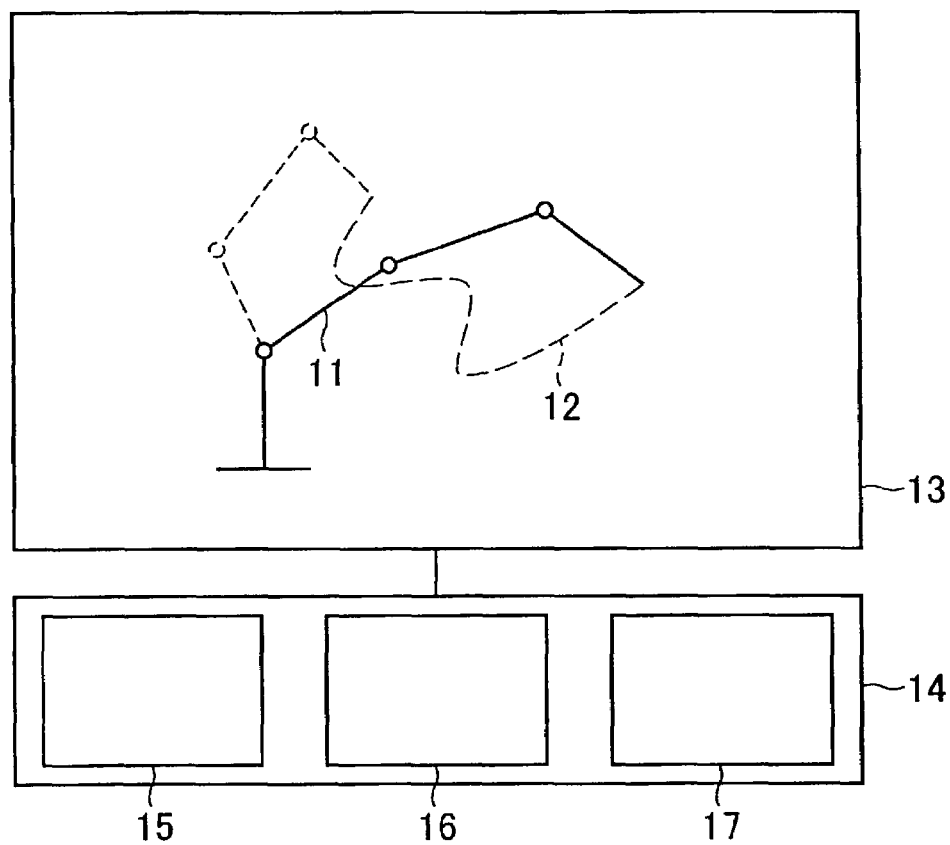
FIG. 2 is a block diagram to show a configuration of substantial parts of a simulation system used in each embodiment.

FIG. 2 is a block diagram to show the configuration of substantial parts of the simulation system 1. As shown in the drawing, the entire simulation system comprises a display part to provide a display screen 13 and a main part 14. The main part 14 is provided with an animation calculation display unit 15, a data storage unit 16, and motion calculation processing unit 17 of the operating machine.

Though not shown in the drawing, various parts of the simulation system are provided, as needed, with a keyboard, mouse, or the like for manually editing, modifying, and inputting the program data, parameter data, instructions, or the like. Moreover, a main CPU, which is not shown, governs each part of the simulation system according to the system program or the like stored in the data storage unit 16. The sending and receiving of the data via the communication line 4 is performed through a suitable input/output interface (not shown).

In addition, the program data and parameters necessary for executing the processing in each example of the invention are stored in the data storage unit 16, and the activation, readout, writing, modification of them are controlled by the main CPU. Some possible examples in accordance with the aspects of the data provided in the 2D-CAD system 2 or 3D-CAD system 3 will be described below. In the following description, the term 'CAD system' is used to refer to either the 2D-CAD system 2 or the 3D-CAD system 3 as appropriate.

Embodiment 1

Figure 8A:
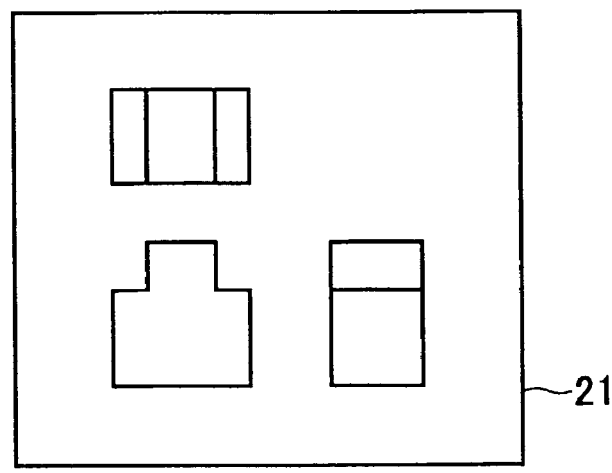
FIGS. 8A to 8C are schematic views to show the first and the second embodiments.

The two-dimensional geometric information created by a CAD system, for example, by the CAD system 2 independent of the simulation system 1 is imported into the simulation system 1 through an electric communication line 4 or an electronic medium. Wherein, it is assumed that a two-dimensional drawing 21 of the workpiece as shown in FIG. 8A is provided in the CAD system 2. The two-dimensional drawing 21 of the workpiece consists of a top view, a front view, and a right side view, and the data to identify the contour of the workpiece on these views are outputted in a file format.

The simulation system 1 imports this file output. For this import, the transformation of data record format etc. are required, and for that end, commercially available software 'ROBOGUIDE'® may be used. The contour of the workpiece is laid out on the screen 13 of the simulation system 1 using the imported two-dimensional geometric information.

Figure 8B:
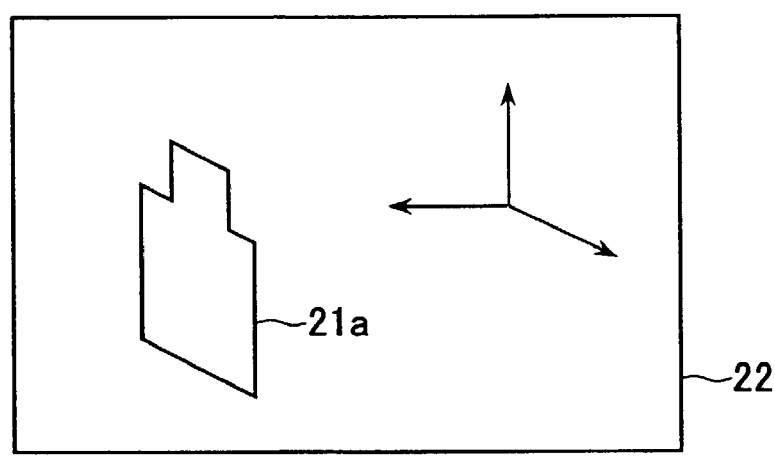

As the simplest case, the workpiece is laid out on the screen 13 as a two-dimensional drawing without modification, for example, by displaying its front view or top view. The layout position is determined to be a position considered to better correspond to real operation condition from other information (where layout information is not inputted from a CAD system). Moreover, by specifying the orientation of the front view data of the workpiece, it is possible to lay out the workpiece on the screen 13 displaying it in a three-dimensional manner as denoted by reference numeral 21*a* in FIG. 8B.

Further, a robot is laid out on the screen 13. In this case, the data of the three-dimensional model of the robot, which is created in advance and stored in the data storage unit 16, are used to display the three-dimensional model 11 of the robot (see FIG. 2) on the screen 13. The display position (layout position) of the three-dimensional model 11 of the robot is determined to be a position which is considered to better correspond to real operation condition from other information (wherein the layout information is not inputted from the CAD system).

Figure 9A:
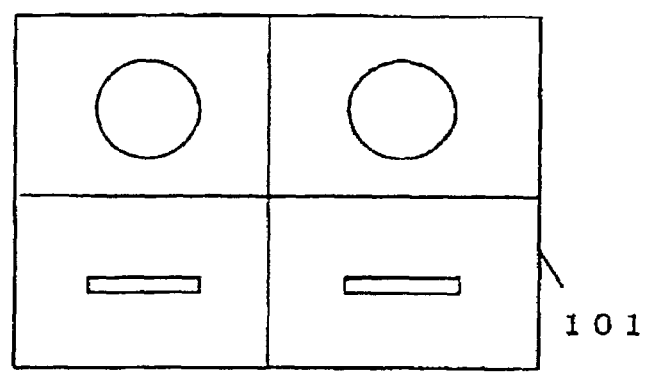
FIG. 9A shows an example of CAD drawing of a workpiece.
Figure 9B:
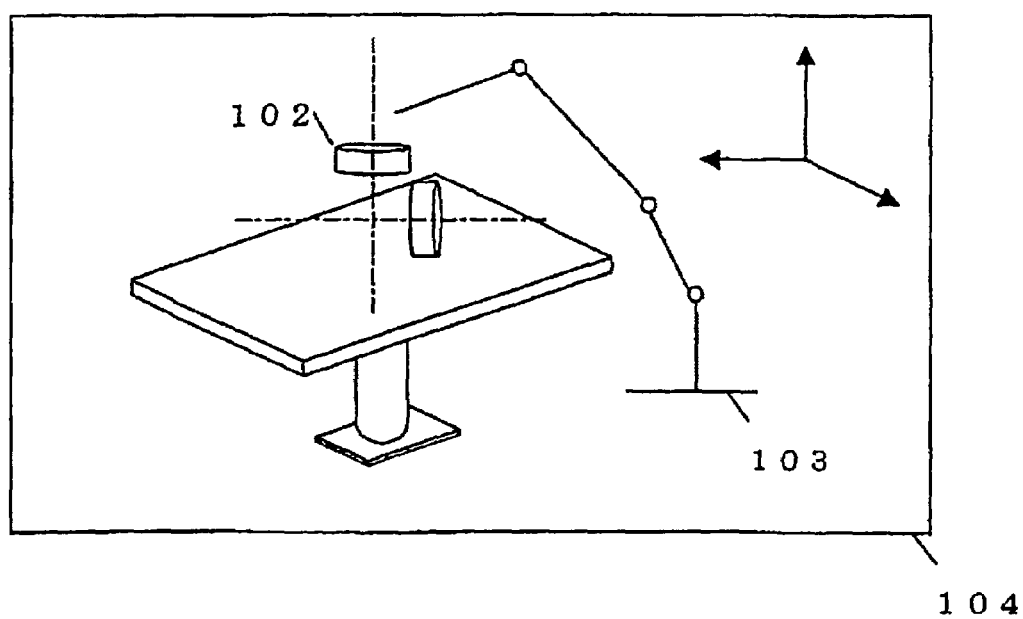
FIG. 9B shows an example in which a three-dimensional model of a workpiece created from the CAD drawing and a three-dimensional model of the robot are laid out and displayed on a screen.

FIG. 9B shows an example in which a three-dimensional model 102 of the workpiece and a three-dimensional model 103 of the robot are aligned and simultaneously displayed on the screen 104 of the simulation system 1. In this case, the CAD drawing of the workpiece is assumed to be one shown by reference numeral 101 in FIG. 9A (a right side view, a left side view, a top view, and a bottom view). The three-dimensional model 102 of the workpiece is created in the simulation system 1 based on the data imported from the CAD system. Also, the three-dimensional model 103 of the robot is created in advance and stored in the data storage unit 16.

Next, an operating-point sequence (for example, a sequence of welding points) is created by specifying a sequence of points, line segments, or planes using the shape data of the workpiece imported in the simulation system 1. Furthermore, a motion program is created from this operating-point sequence. Explanation of the creation of the motion program from the operating-point sequence is omitted since that is similar to an ordinary off-line programming.

Figure 3:
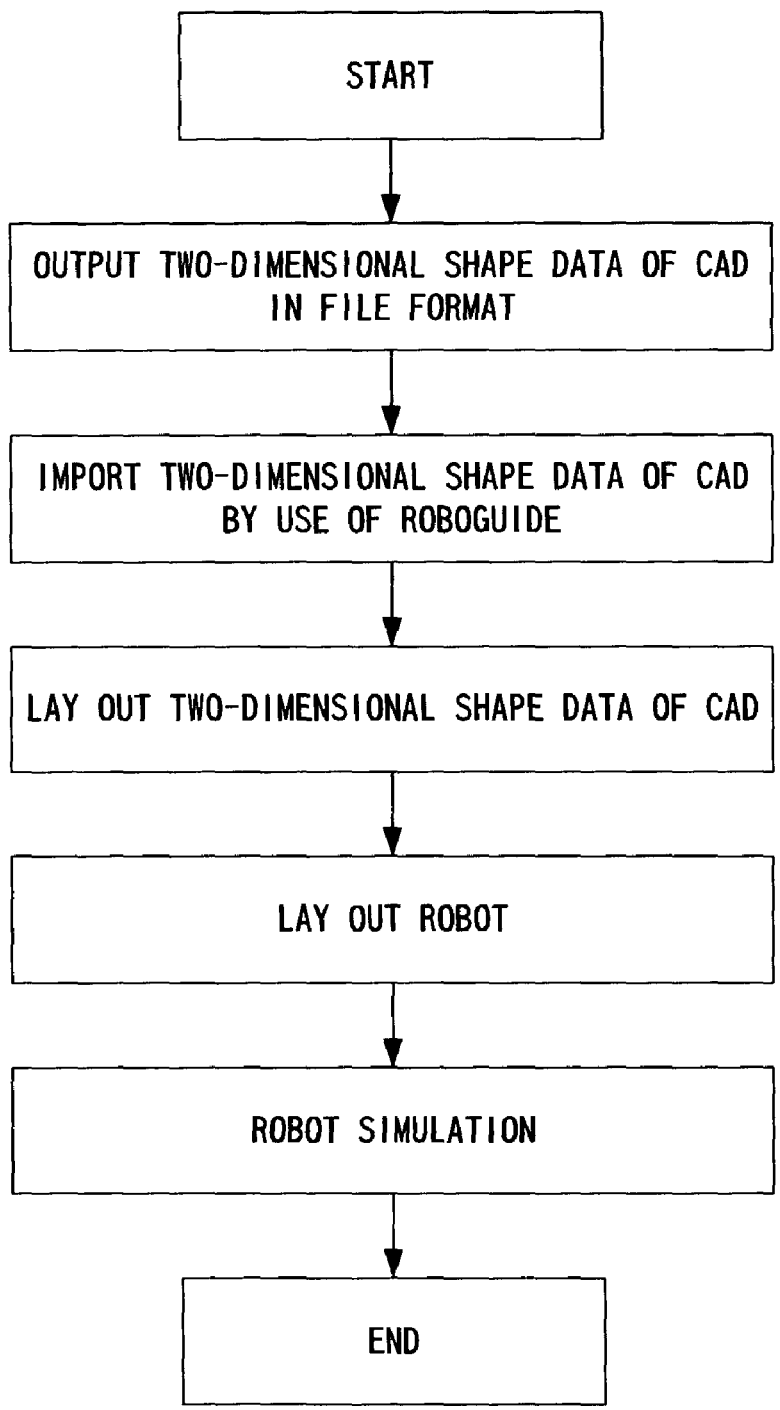
FIG. 3 is a flowchart to briefly show a procedure in a first embodiment.

When the motion program is ready, the robot simulation is performed according to the data of this motion program. As a result of this, the motion locus 12 of the robot (generally an operating machine) is displayed on the screen 13 in an animation format. That is, motion locus 12 is displayed in an animation format using the motion program data including the data specifying the operating-point sequence by means of the animation calculation display unit 15 and the motion calculation processing unit 17 of the operating machine. Since this technique is well known, its detailed explanation is omitted. On the screen 13 in FIG. 2, the layout image of the workpiece is omitted. Also, the above described procedure may be briefly shown by a flowchart in FIG. 3.

Embodiment 2

In the above described Embodiment 1, the workpiece which is imported from the CAD system 2 and laid out on the screen 13 of the simulation system 1 is displayed in a two-dimensional shape. However, it is possible to modify this data to lay them out on the screen 13 as a three-dimensional model of lines and planes. The present embodiment will describe a simple example of such case.

In the present embodiment, the two-dimensional data imported from the CAD system 2 are added with position information in a virtual three-dimensional space displayed on the screen 13 to create a three-dimensional model consisting of lines and planes to be laid out on the screen 13. When a simple model is sufficient for desired simulation, the creation of a three-dimensional model may be simplified. The procedure according to this example is as follows.

Two-dimensional geometry information created by a CAD system, for example, the CAD system 2 independent of the simulation system 1, are imported into the simulation system 1 through an electric communication line 4 or an electronic medium. In this case, the contour data of the two-dimensional drawing 21 (a top view, a front view, and a right side view) of the workpiece as shown in FIG. 8A are outputted in a file format. These data are, as in the case of the first embodiment, stored in the data storage unit 16 temporarily as two-dimensional drawing data by using commercially available software 'ROBOGUIDE'®.

At least two drawings created by the orthographic projection method are imported from the CAD system, and a three-dimensional model is created by indicating the positional relationship between the two drawings. For example, when the two drawings are a front view and a right side view (see FIG. 8A), it is indicated that the imported drawings are a front view and a right side view. Also, by selecting the same position on each of the two drawings, the positional relationship of the two drawings is given. Since, in these two drawings, three-dimensional shape information is written, the depth of any part of the object can be easily specified while the drawings being watched.

Figure 8C:
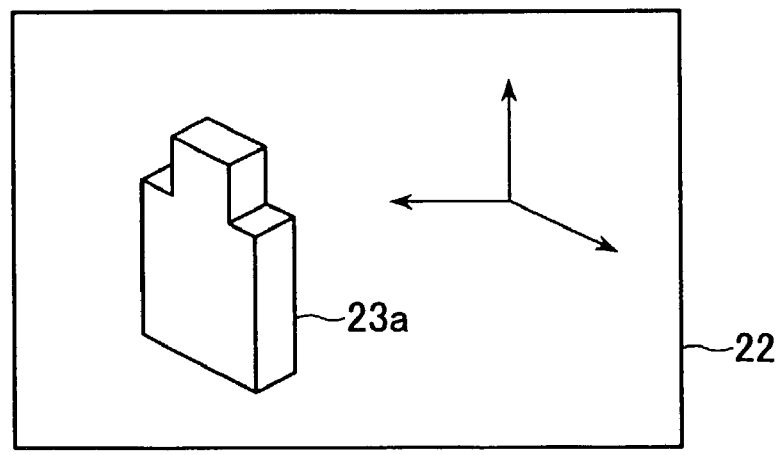

Utilizing the two drawings, three-dimensional models are created by means of techniques of generating three-dimensional models used in existing three-dimensional CAD systems such as pushing-out and cutting-off of any part of the object. Since the operator can perform the creation of a three-dimensional model while watching the two drawings, he/she can perform pushing-out or cutting-off precisely thereby creating the three-dimensional model more precisely and rapidly. Moreover, data processing and screen display tools, which are necessary for the creation of such three-dimensional models, can be provided by commercially available software 'ROBOGUIDE'®. A created three-dimensional model of a workpiece looks like the three-dimensional model 23a shown in FIG. 8C. Such a three-dimensional model, which has been created by using projection data of two or more directions such as a front view and a side view and further making necessary modifications of those data, is called an "interactively created three-dimensional model."

Figure 10A:
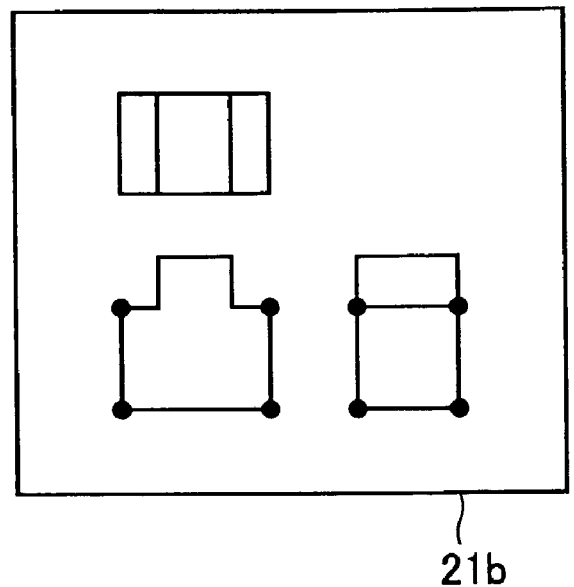
FIG. 10A shows a condition in which both ends of a projected line segment are selectively specified on a two-dimensional CAD drawing in the second embodiment.
Figure 10B:
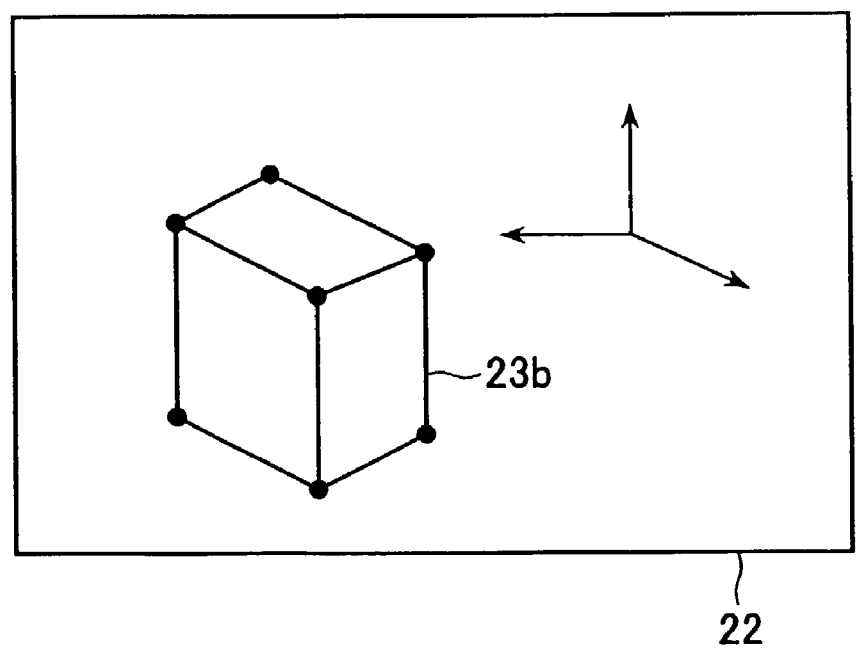
FIG. 10B shows a middle step of creating three-dimensional model corresponding to a line segment based on three-dimensional information.

FIGS. 10A and 10B show, on the two-dimensional CAD drawing 21, a middle step of creating a three-dimensional model 23b in which three-dimensional position information (see small solid circles in FIG. 10B) of the original line segment is obtained based on the position information of four points (see small solid circles in FIG. 10A) obtained by selectively specifying both ends of a corresponding projected line segment on each projection drawing of two directions (for example, a front view and a side view). Similarly from projection drawings of two directions, three-dimensional information for an original circle may be obtained based on the position information of six points obtained by selecting three points from each of a corresponding projected circle and a projected line segment on each of the projection drawings of two directions.

Next, the robot is laid out on the screen 13. At this time, the data of a three-dimensional model of the robot, which has been prepared in advance and stored in the data storage unit 16, are used to display the three-dimensional model 11 (see FIG. 2) of the robot on the screen 13. The display position (layout position) of the three-dimensional model 11 of the robot is determined in such a way that it corresponds to the actual operation situation from other information (in this case, the layout information is not imported from the CAD system).

Further, an operating-point sequence (for example, sequence of welding points) is created by specifying a sequence of points, line segments, or planes using the data of the three-dimensional model 23a or the shape data of other workpieces imported from the CAD system 2 as needed. Then a motion program is created from the operating-point sequence. The creation of a motion program from an operating-point sequence is similar to an ordinary off-line programming, and therefore its explanation is omitted.

Figure 4:
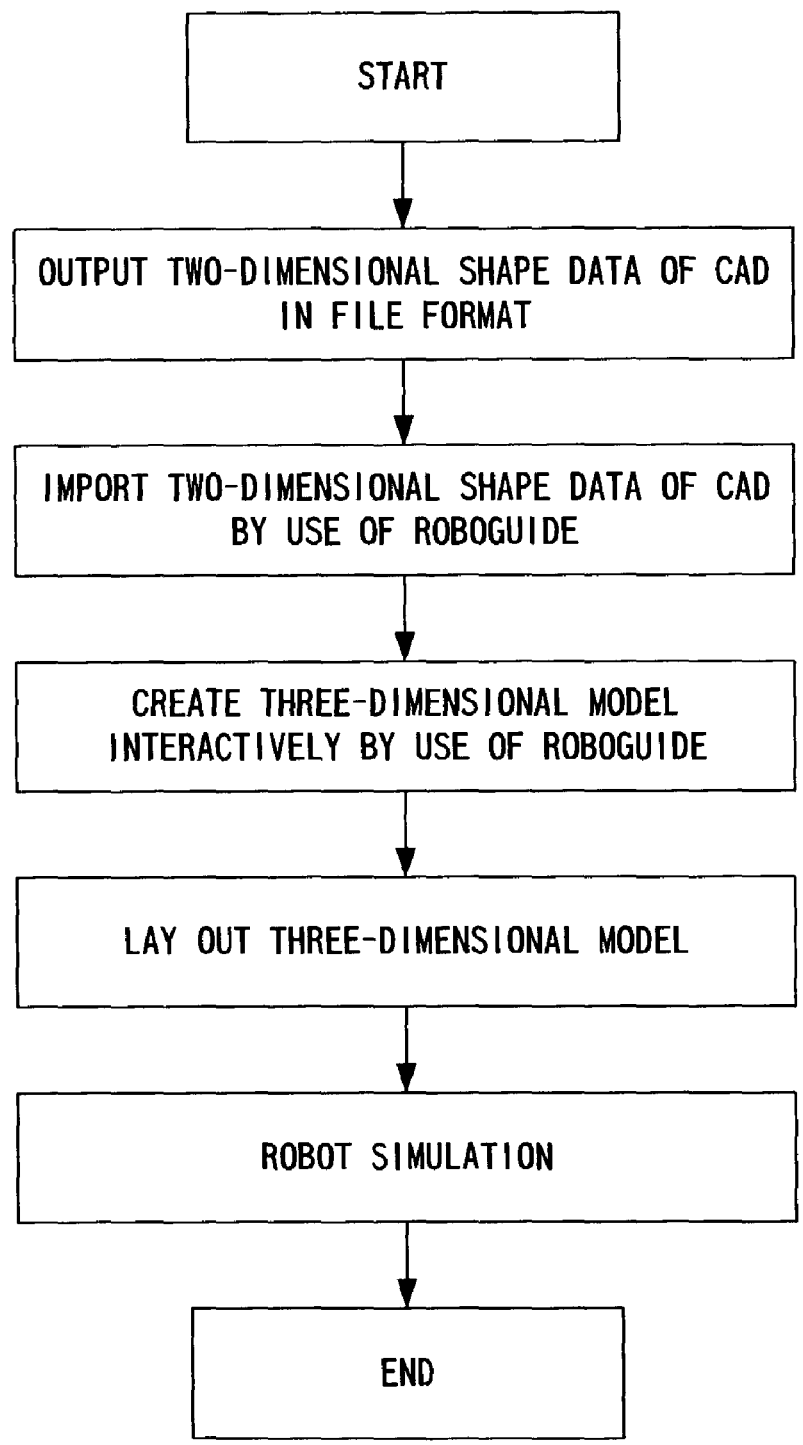
FIG. 4 is a flowchart to briefly show a procedure in a second embodiment.

Upon creation of the motion program, a robot simulation is performed according to the data of this program. By doing this, a motion locus 12 of the robot (generally an operating machine) is displayed on the screen 13 in an animation format. Although the layout image of the workpiece is omitted on the screen 13 in FIG. 2, the image to be displayed thereon is one that will be produced by superimposing the screen 22 of FIG. 8C on the screen 13 of FIG. 2. The process described so far may be summarized by a flowchart shown in FIG. 4.

Embodiment 3

In this embodiment, the layout position as well as two-dimensional shape information or three-dimensional model of peripheral equipment, operating machines, and workpiece are imported from the CAD system 2 or 3. Based on this layout information, the peripheral equipment, operating machine and workpiece are laid out in a virtual three-dimensional space displayed on the screen of the simulation system 1. By doing this, the system of a three-dimensional model can be constructed easily. The procedure in the present embodiment is as follows.

Two-dimensional or three-dimensional geometric information and layout information concerning the workpiece and others (data to show where the workpiece etc. are laid out in the operational space) prepared in a CAD system, for example, the CAD system 2 or 3 independent of the simulation system 1 are imported to the simulation system 1 via an electric communication line 4 or an electronic medium.

Figure 11A:
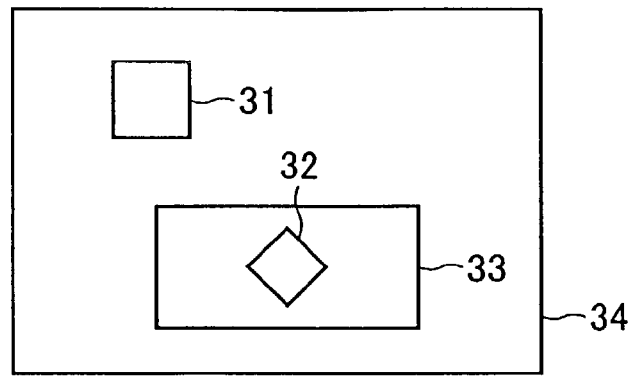
FIGS. 11A and 11B are schematic views to explain the third embodiment.

The layout information includes a plurality of plan view data: a layout plan 31 of an operating machine (a robot), a layout plan 32 of a workpiece, and a layout plan 33 of a worktable, as shown in FIG. 11A. The layout data including such data and the two-dimensional shape data of the workpiece and the worktable are outputted from the CAD2 in a file format. These data are temporarily stored in the data storage unit 16 by utilizing the commercially available software 'ROBOGUIDE'®. These data are stored in the data storage unit 16 even when the layout information is given as three-dimensional data.

Figure 11B:
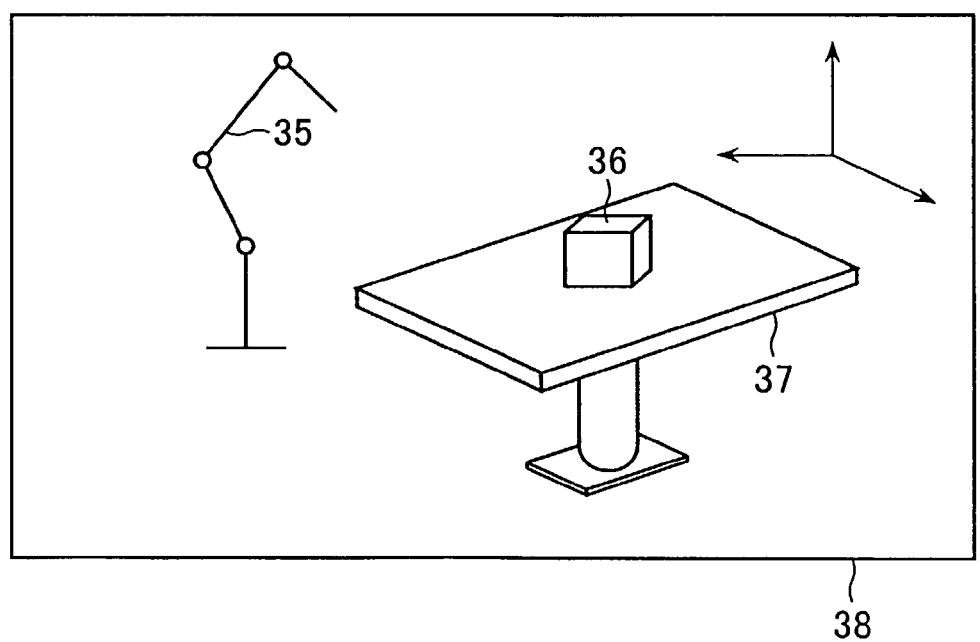

As the two-dimensional shape data of the workpiece and worktable, it is possible to utilize at least two drawings that are created by the orthogonal projection method as described in the second embodiment. From these drawings, as described in the second embodiment, three-dimensional models of the workpiece and worktable are created. The software for data processing and screen display, which is needed for creating such three-dimensional models, can also be provided by the commercially available software 'ROBOGUIDE'®. An example of the created three-dimensional models of the workpiece and worktable includes three-dimensional models 36 and 37 shown in FIG. 11B.

The three-dimensional model 35 of the operating machine (a robot) has been created in advance and is stored in the data storage unit 16. But in some cases, the data prepared in the CAD system 3 may be used by modifying them as needed.

The prepared three-dimensional models 35, 36, and 37 for the operating machine (a robot), the workpiece, and the worktable are laid out on the screen 38 of the simulation system 1. The layout positions of the component models 35 to 37 are determined based on the layout information (plan view data or three-dimensional layout data) imported from the CAD system 2 or 3. When the layout information is given as plan view data, the layout positions of the three-dimensional models 35 to 37 on the screen 38 can be determined by, for example, specifying (for example, clicking on the screen 38) vertex points (one or more) of the layout FIGS. 31 to 33 of each component. The software for such data processing needed for layout and screen display can be prepared by commercially available software 'ROBOGUIDE'®.

Moreover, using data of the three-dimensional models 35 to 37 or the shape data of the workpiece imported from the CAD system 2 as needed, an operating-point sequence (for example, a sequence of welding points) is created by specifying point sequences, line segments, and planes. And, a motion program is created from the operating-point sequence. The creation of the motion program from the operating-point sequence is similar to an ordinary off-line programming, and therefore its explanation is omitted.

Figure 5:
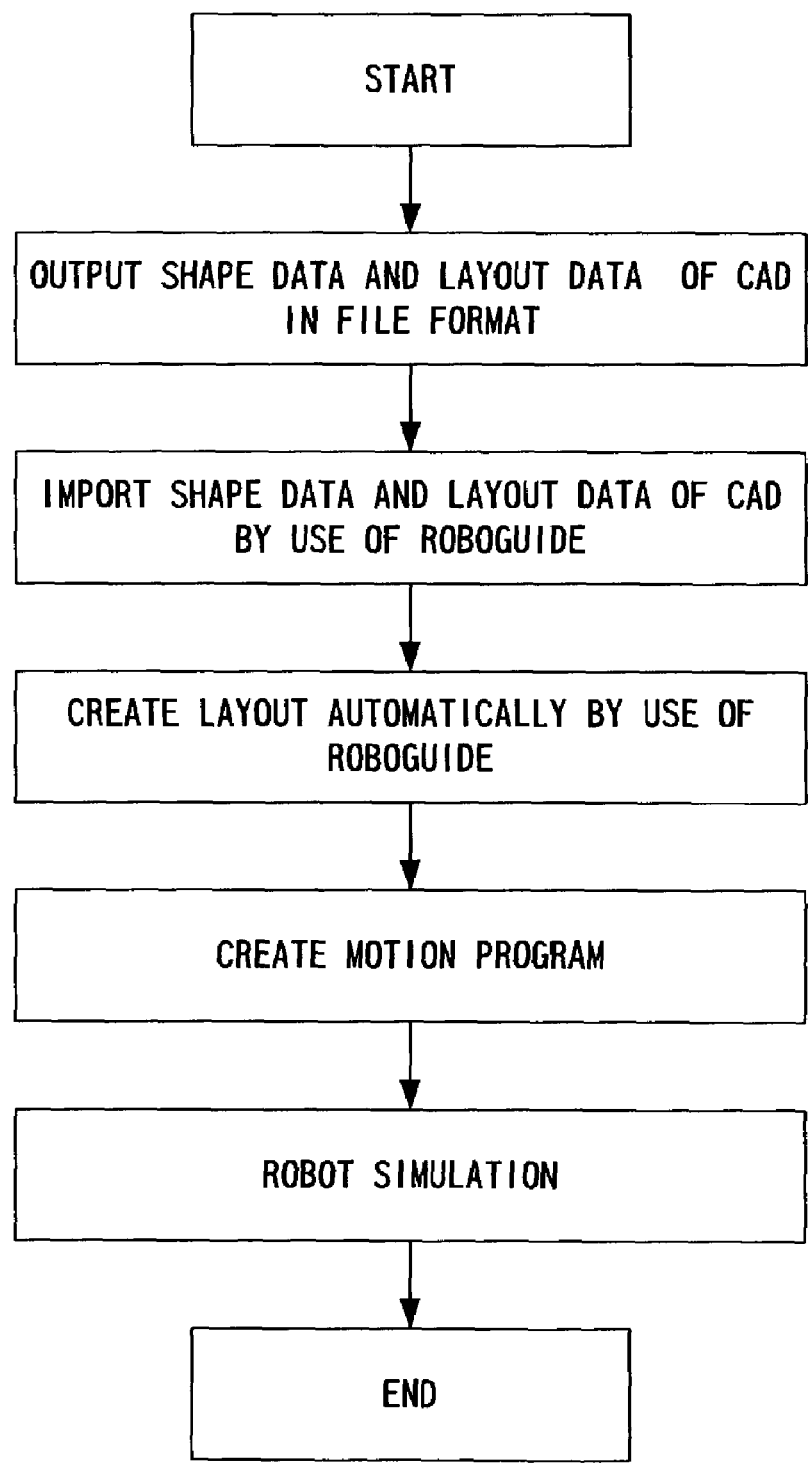
FIG. 5 is a flowchart to briefly show a procedure in a third embodiment in case where layout information is prepared as three-dimensional data in the CAD system.
Figure 6:
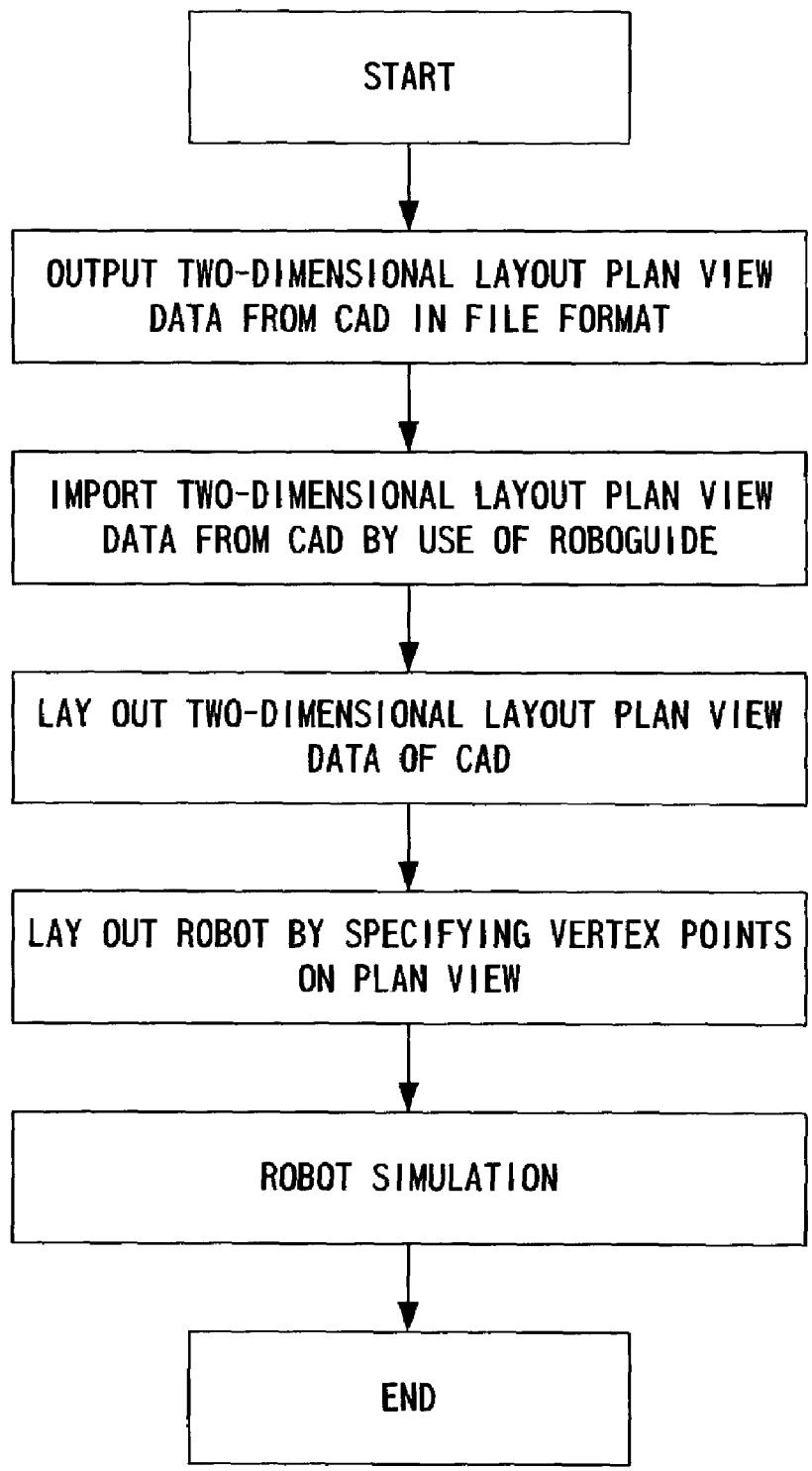
FIG. 6 is a flowchart to briefly show the procedure in the third embodiment in case where the layout information is prepared as plan view data in the CAD system.

When the motion program has been generated, a robot simulation is performed according to the data of this motion program. As a result of this process, a motion locus 12 of the robot (generally an operating machine) is displayed on the screen 13 (screen 38 in FIG. 11B) in an animation format. Although the layout images of the workpiece and the worktable are omitted on the screen 13 in FIG. 2, an image similar to one which is formed by superimposing the screen 38 in FIG. 11B on the locus 12 shown in FIG. 2 is supposed to be displayed. The above described procedure can be briefly summarized by a flowchart in FIG. 5 (a case in which three-dimensional layout information is prepared) or FIG. 6 (a case in which the layout information is prepared as a plan view). In these flowcharts, the description of the step of creating the three-dimensional models is omitted.

Embodiment 4

In some cases, the CAD system 2 or 3 is provided with operating-point information as well. Thus, in this embodiment, a case is considered in which the CAD system 2 or 3 is provided with shape information (two-dimensional data or three-dimensional data) of the peripheral equipment, the operating machine and the workpiece, their layout information, and operating-point information as well. In this case, the operating-point information, which is the position information for operating the operating machine (a robot), can be imported from the CAD system and or from a drawing created by the CAD system to easily specify the motion of the robot. Thus, it is made possible to rapidly and accurately perform simulations in which a three-dimensional model of a moving structure such as a robot is operated on the screen according to the operating-point sequence information.

There also may be a case in which the three-dimensional shape information and three-dimensional model imported from the CAD system are provided with an operating-point sequence indicated by symbols or the like. When operating points of a robot have been studied by a CAD system, it is possible to eliminate the need for defining the operating-point sequence again in the simulation system by importing the drawing which has been obtained as a result of the study into the simulation system, thereby reducing errors in the operating-point sequence. The procedure in the present embodiment will be exemplified as follows.

The shape data and layout data of the peripheral equipment, the machine, the hand, and the welding gun as well as the operating-point sequence is outputted in a file format from the CAD system. Then these data are imported to the simulation system 1 by using the commercially available software 'ROBOGUIDE'®. Based on the imported layout data, the imported shape data are laid out. Also, a motion program of the robot is created from the operating-point sequence. With patterns of robot motion program (operating points are not yet defined) and time charts being stored in the simulation system 1, it is possible to complete the motion program by importing the above described operating-point sequence into the pattern or the time chart of the motion program. This type of method is well known, and therefore its explanation is omitted.

Figure 7:
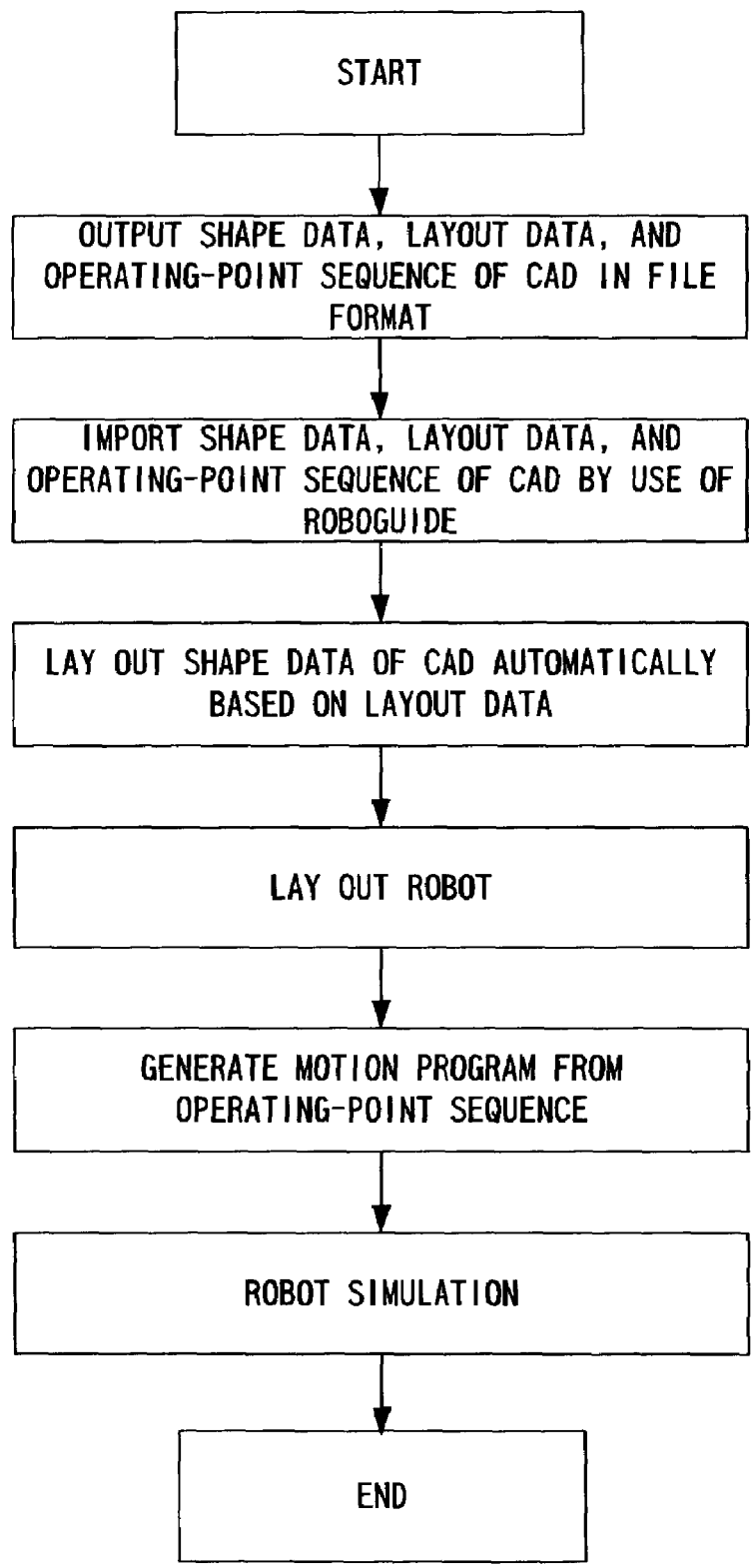
FIG. 7 is a flowchart to briefly show a procedure in a fourth embodiment.

Then, the motion program is executed to perform a robot simulation. As a result of this simulation, the three-dimensional models of the robot and the surrounding objects (workpiece etc.) as well as a motion locus of the robot (see reference numeral 12 in FIG. 2) are displayed on the screen 13 of the simulation system 1. The above described procedure can be briefly summarized in a flowchart shown in FIG. 7.

According to the present invention, by importing a three-dimensional model or two-dimensional drawing created by a CAD system in advance and their layout information into the simulation system from a CAD system or the like, it is made possible to rapidly and accurately construct a three-dimensional model of the above described system in a short time, thereby enabling an off-line simulation. It is also made possible to create a simplified three-dimensional model by utilizing two-dimensional shape information such as a plan view imported from the CAD system without any modification. Moreover, it is possible to easily create a three-dimensional model utilizing the two-dimensional shape information.

More specifically, by utilizing two-dimensional shape information or three-dimensional models of the robot, the peripheral equipment, and the workpiece stored in, for example, a CAD system, it is made possible to eliminate the need of creating a new three-dimensional model for simulation and to construct a robot system on a virtual space to be displayed on the screen of the simulation system accurately in a short time thereby enabling the execution of a simulation.

Upon performing a simulation, when there is any object that does not need any accurate three-dimensional model, it is possible to reduce the time and effort for creating a three-dimensional model by creating a simplified three-dimensional model by laying out the two-dimensional drawing of an object in the three-dimensional space without modification. When two-dimensional drawings of the workpiece or the like have been created by a CAD system, since three-dimensional shape information of the components of the workpiece can be obtained easily from its plan view and side view, a three-dimensional model can be created rapidly and accurately from the information.

When a system layout plan or the like have been created by the CAD system, this layout information also can be imported into the simulation system to rapidly and accurately layout three-dimensional models such as the robot in a virtual three-dimensional space to be displayed on the screen of the simulation system thereby enabling rapid execution of the simulation. Also, by importing operating points of the robot from a CAD system or drawings created by the CAD system, it is possible to eliminate the need for newly defining the operating points in the simulation system, thereby enabling rapid and accurate simulations.

By using the operating-point sequence, it is possible to complete the robot motion program stored in the simulation system, and perform a simulation for operating the three-dimensional model of the robot.

The invention claimed is:

1. A simulation system for performing a practical simulation combining three-dimensional model of an operating machine such as a robot and a machine tool with three-dimensional model of a peripheral equipment or a workpiece, comprising:

means for storing a three-dimensional model of the operating machine;

drawing information input means for inputting drawing information representing at least one two-dimensional shape of the peripheral equipment or the workpiece, the drawing information including three-dimensional layout information for laying out the two-dimensional shape in a three-dimensional manner and operating-point information indicating a position at which the operating machine is operated;

three-dimensional model generation means for assembling the three-dimensional model of the peripheral equipment or the workpiece by laying out the two-dimensional shape on a screen of the simulation system based on said three-dimensional layout information; and means for operating the three-dimensional model of the operating machine on said screen based on the operating-point information accepted from said drawing information.

2. A simulation system for performing a practical simulation combining a three-dimensional model of an operating machine such as a robot and a machine tool with a three-dimensional model of peripheral equipment or a workpiece, comprising:

means for storing a three-dimensional model of an operating machine;

means for acquiring operating-point information representing a positions at which the operating machine is operated;

drawing information input means for inputting drawing information representing at least one two-dimensional shape of the peripheral equipment or the workpiece, the drawing information including three-dimensional layout information for laying out the two-dimensional shape in a three-dimensional manner;

three-dimensional model generation means for assembling the three-dimensional model of the peripheral equipment or the workpiece by laying out said two-dimensional shape on a screen of the simulation system based on the three-dimensional layout information; and means for operating said three-dimensional model of the operating machine on said screen based on said acquired operating-point information.

3. The simulation system according to claim 1, wherein said three-dimensional model generation means comprises means for creating three-dimensional shapes by giving a thickness to any portion of a plane or a line or a two-dimensional shape represented in said drawing information.

4. The simulation system according to claim 1, wherein said drawing information is a projection drawing of at least two directions, and said three-dimensional model generation means generates a three-dimensional model based on said projection drawing of at least two directions and each of the directions.

5. The simulation system according to claim 4, wherein said projection directions are two mutually perpendicular directions, and three-dimensional information of an original line segment is obtained based on position information of four points obtained by selecting both ends of the corresponding projected line segment on each projection drawing of said two directions.

6. The simulation system according to claim 4, wherein said projection directions are mutually perpendicular two directions, and the three-dimensional information of an original circle is determined based on position information of six points obtained by choosing three points in the corresponding projected circle and three points in the corresponding projected line segment on each projection drawing of the two directions.

7. The simulation system according to claim 5, wherein said two projection drawings are any combination of mutually perpendicular projection directions selected from a front view, a right side view, a left side view, a top view, a bottom view, and a rear view based on a trigonometry or a mono-angular projection.

8. The simulation system according to claim 1, further comprising:

means for storing said instruction program or time chart of the operating machine; and means for operating said three-dimensional model of the operating machine on said screen according to said instruction program or said time chart.

9. The simulation system according to claim 1, wherein there are included a plurality of operation machines.

* * * * *

UNITED STATES PATENT AND TRADEMARK OFFICE
CERTIFICATE OF CORRECTION

PATENT NO. : 7,027,963 B2
APPLICATION NO. : 10/286863
DATED : April 11, 2006
INVENTOR(S) : Atsushi Watanabe et al.

It is certified that error appears in the above-identified patent and that said Letters Patent is hereby corrected as shown below:

Column 11, line 13, change "positions" to --position--

Signed and Sealed this

Fifth Day of September, 2006

JON W. DUDAS
*Director of the United States Patent and Trademark Office*